Dec. 2, 1947.  R. HAINO  2,432,009
ELECTRIC SOLDERING IRON
Filed July 10, 1945
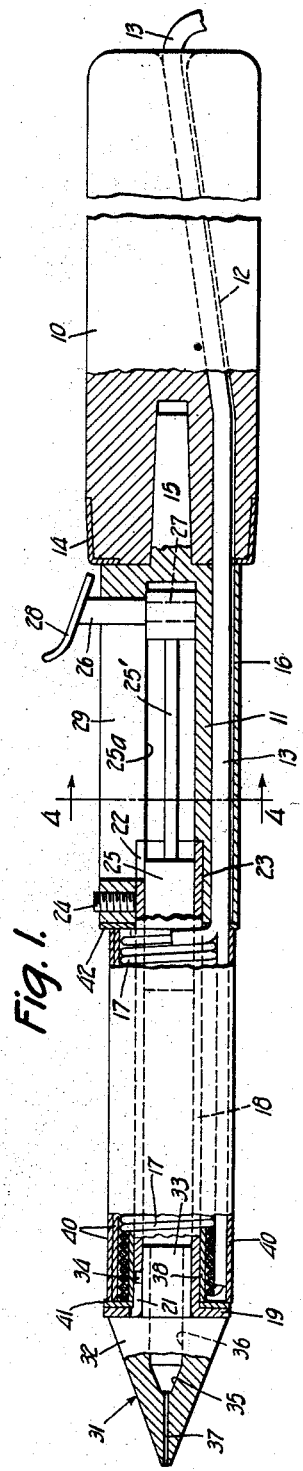
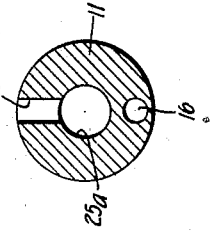
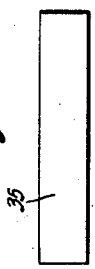
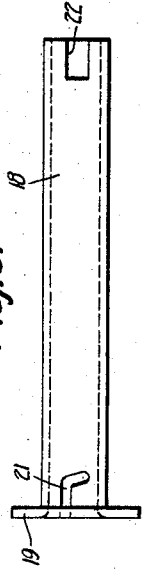
INVENTOR.
Reinhold Haino
BY
Moses, Nolte, Crews & Berry
ATTORNEYS Patented Dec. 2, 1947

2,432,009

UNITED STATES PATENT OFFICE 2,432,009

ELECTRIC SOLDERING IRON

Reinhold Haino, Bronx, N. Y.

Application July 10, 1945, Serial No. 604,129

4 Claims. (Cl. 219—27)

This invention relates to electric soldering irons and more particularly to such soldering irons in which the solder is retained in a molten state within the iron itself and dispensed through a hole in the soldering iron point when the workman whose hand is on the handle forces with his thumb a plunger serving to cause the extrusion of a small quantity of molten solder through the iron point when required.

It is an object of the present invention to provide an electric soldering iron of this type which is simple in construction, easy to assemble and easy to refill with solder.

It is another object of the present invention to provide a soldering iron construction wherein the soldering point itself may contain a large volume of the molten solder so as to carry the heat therefrom well into the very tip of the soldering point and help to maintain its high temperature.

According to the invention there is provided a handle having an opening therethrough for wires. In the forward end of the handle is fitted a hollow part. To the forward end of this hollow metal part there is connected a sleeve surrounded with insulation and adapted to carry heating coil. The hollow part likewise has an opening therethrough adapted to receive the wires from the handle and to direct them to the heating coil about the sleeve. Within the hollow part and adapted to be extended into the sleeve is a plunger serving to extrude molten solder within the sleeve through a solder point which is removably secured to the forward end of the sleeve to permit the insertion into the sleeve of a solid supply stick of solder.

The workman grasps the handle and operates the plunger with his thumb. He presses against a radially extending operating means connected to the plunger and operable along an axially extending slot in the hollow part. In order that the soldering point can be adequately heated, the central bore through which the solder is extruded has a section extending well into the forward end of the point which is of large diameter and adapted to contain a large body of the solder. Forwardly of this large section is a small diameter section through which small amounts of the solder is extruded as the plunger in the hollow part is pushed forwardly. Bayonet slot means is provided in the forward end of the sleeve for effecting the connection between the soldering point and the sleeve. The sleeve and the plunger is made of aluminum so that there is little possibility of the solder fouling the parts and interfering with the operation of the iron.

For a better understanding of the invention reference may be had to the following detailed description taken in connection with the accompanying drawing in which Fig. 1 is a side view of the soldering iron with parts thereof broken away and shown in section;

Fig. 2 is a side view of the solder stick or slug;

Fig. 3 is a side view of the sleeve adapted to contain the solder stick; and

Fig. 4 is a cross-sectional view through the hollow part of the iron and along the line 4—4 of Fig. 1, the parts supported by said hollow part being omitted.

Referring now to the figures, 10 is a handle to which is connected a hollow part 11. The handle 10 may be of wood or of any other heat and electric insulating material and has an opening 12 therethrough adapted to contain the cable wires 13. The hole 12 extends from the central part of the rear face of the handle to the forward face of the handle and removed at that point somewhat from the center thereof. The forward end of the handle 10 has a reinforcing ring 14 of angle section.

The hollow part 11 has a rearwardly extending prong 15 wedged into the handle 10 whereby the hollow part 11 becomes actually rigid with the handle. The hollow part 11 also includes an opening 16 registering with the opening 12 of the handle so as to receive the cable wires 13 and direct the same to the forward end of the hollow part 11 to form a heating coil 17 surrounding a sleeve 18, rigidly connected to the hollow part 11.

The sleeve 18, as shown in Fig. 3, has a flange 19 and a bayonet slot 21 at its forward end and at its rear end it has a slot 22 for a purpose to be hereinafter mentioned. The rear end of the sleeve is adapted to fit an enlarged hollow portion 23 in the forward end of the hollow part 11. It is retained in this enlarged portion against axial displacement by a set screw 24 in the hollow part 11.

Within the hollow part 11 and adapted to extend into the sleeve 18 is a plunger or piston 25. This plunger is located in a hole 25a and is operated by a pin 26 preferably driven into the rearward end thereof as indicated at 27 and containing a thumb plate 28. The pin 26 is movable longitudinally of the hollow part in an axially extending slot 29 which extends a substantial distance throughout the length of the hollow part of the main body. The plunger 25 has a narrow portion 25' so as to lessen the amount of heat transmitted from the solder to the thumb plate 28. Air will surround this portion 25' in the hole 25a, and this too will tend to keep the plunger cool.

Also the portion 25' may be of heat insulating material to further reduce the heat transmitted.

The recess 22 in the sleeve 18 is a clearance slot for the pin 26 when the plunger 25 has been pushed to its extreme forward position. The plate 28 is inclined downwardly and rearwardly so as to be easily available to the workman's thumb as he grasps the handle 10 with his hand. By pushing on the plate 28 with the thumb the solder contained in sleeve 18 is fed forwardly through a soldering point 31 connected to the forward end of the sleeve 18.

This soldering point 31 includes an enlarged head portion 32 and a shank 33 having a radially extending pin 34 thereon adapted to fit the bayonet slot 21 of the sleeve 18. The soldering point can be easily removed from or connected to the sleeve when desired to insert within the sleeve a solid soldering stick or slug 35, Fig. 2.

Throughout the length of the soldering point 31 is a central bore 35 having a large diameter section 36 and a small diameter section 37 leading to the forward end of the point. The large section 36 extends throughout the length of the shank 33 and well into the head portion 32 of the point. By having the central bore 35 enlarged throughout this length a large body of the hot molten solder may be contained in the point so as to facilitate the heating of the same. At the same time, hot solder is taken well into the tip of the soldering point so that the distance through which the solder needs to be forced into the soldering point to arrive at its point of application upon the work is of minimum length. There is little opportunity for a solder to become frozen within the soldering point with this arrangement.

Immediately surrounding the sleeve is an insulating cylinder 38 on the outer side of which the heating coil 17 is disposed. Surrounding the heating coil are other insulating layers 40 which may be composed of mica. Abutting the flange 19 and at the end of the heating coil 17 is a mica insulating disc 41. At the opposite end of the heating coil and abutting the forward face of the hollow part 11 is a mica insulating disc 42.

When it is desired to refill the soldering iron with another or fresh stick of solder 35, the soldering point 31 is rotated and withdrawn axially from the bayonet slot 21 of the sleeve 18. The soldering stick 35 can then be readily inserted since the sleeve being of aluminum will have no fragments of solder adhering to it. In other words, the sleeve and piston being of aluminum provides a clean chamber into which the soldering stick 35 can be inserted without difficulty.

If it is desired to further disassemble the soldering iron, for instance at times when it is desired to replace the heating coil, the set screw 24 can be loosened and the sleeve 18 with the heating coil 17 thereon withdrawn from the hollow part 11.

I have described what I believe to be the best embodiments of my invention. I do not wish, however, to be confined to the embodiments shown, but what I desire to cover by Letters Patent is set forth in the appended claims.

I claim:

1. In a soldering iron, an insulated handle having a detent means at one end, a hollow part having an extrusion for wedging said hollow part into said detent means, outlets in said handle and hollow part aligned with each other for introducing heating current to the soldering iron, a hollow sleeve extending longitudinally along said hollow part and serving as a solder container, a piston operable in said hollow part and said sleeve to force molten solder from the sleeve, a narrow portion on said piston for reducing the amount of heat lost from transmission by the piston and for allowing cooling air to circulate about the piston, a separable soldering point wedged into said hollow part, said point having an enlarged basin aligned with said sleeve for holding molten solder and a smaller opening extending to the edge opposite the hollow part for allowing molten solder to run to the exterior of the iron, a slot in said hollow part extending longitudinally along said hollow part, a pin extending through said slot and connected to said piston rod, and a thumb-operated plate fastened to said pin for allowing the pin to be pushed along the slot.

2. In a soldering iron substantially as described in claim 1, a winding wrapped around said sleeve for heating the solder in said sleeve, insulating means between said winding and said sleeve, and further insulating means between said winding and said hollow part.

3. In a soldering iron substantially as described in claim 1, a set screw for holding said sleeve against longitudinal displacement with respect to said hollow part.

4. In a soldering iron substantially as described in claim 1, a shank on said soldering point, and a bayonet joint on said sleeve whereby said soldering point may be rigidly secured to said sleeve but may be easily detached therefrom for purposes of refilling said sleeve.

REINHOLD HAINO.

REFERENCES CITED

The following references are of record in the file of this patent:

UNITED STATES PATENTS

| Number | Name | Date |
|---|---|---|
| 1,457,508 | Dellman | June 5, 1923 |
| 2,025,509 | Hieber | Dec. 24, 1935 |
| 2,094,795 | Johnson | Oct. 5, 1937 |
| 2,380,138 | Abramson | July 10, 1945 |